(12) United States Patent
Kamen et al.

(10) Patent No.: US 6,980,998 B2
(45) Date of Patent: Dec. 27, 2005

(54) METHOD AND APPARATUS FOR MERGING DATA GRAPHS USING DATA IDENTITY CONTROL

(75) Inventors: Yury Kamen, Foster City, CA (US); Bruce K. Daniels, Capitola, CA (US); Robert N. Goldberg, Emerald Hills, CA (US); Syed M. Ali, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 477 days.

(21) Appl. No.: 10/104,172

(22) Filed: Mar. 22, 2002

(65) Prior Publication Data

US 2003/0182294 A1 Sep. 25, 2003

(51) Int. Cl.[7] .............................................. G06F 17/30
(52) U.S. Cl. .................. 707/103 R; 707/102; 707/101
(58) Field of Search ............................ 707/100, 104.1, 707/103 R, 101–102; 713/182, 201, 150

(56) References Cited

U.S. PATENT DOCUMENTS

| | | | |
|---|---|---|---|
| 6,604,236 B1 * | 8/2003 | Draper et al. | 717/170 |
| 2002/0083327 A1 * | 6/2002 | Rajasekaran et al. | 713/182 |
| 2002/0133515 A1 * | 9/2002 | Kagle et al. | 707/511 |

* cited by examiner

Primary Examiner—Jeffrey Gaffin
Assistant Examiner—Neveen Abel-Jalil
(74) Attorney, Agent, or Firm—Osha Liang LLP

(57) ABSTRACT

A method for merging a first object graph with a second object graph, including packaging the first object graph into an internal representation, wherein the internal representation includes an attribute value and an object identity for each of a plurality of objects in the first object graph, sending the internal representation to a receiver, traversing the internal representation by the receiver, updating an object instance in the second object graph with the attribute value from the internal representation, if the object identity corresponding to the object instance is found in an identity mapping table, creating and populating a new object instance with the attribute value from the internal representation, if the object identity corresponding to the new object instance is not found in the identity mapping table, and linking the new object instance to the second object graph.

7 Claims, 6 Drawing Sheets

METHOD AND APPARATUS FOR MERGING DATA GRAPHS USING DATA IDENTITY CONTROL

BACKGROUND OF INVENTION

An "object graph" is a collection of related objects which are represented in forms including binary, text, XML ("Extensible Markup Language"), etc. FIG. 1 illustrates a class diagram. The class diagram (3) represents the classes that may be present in a given object graph, attributes associated with the classes, the relationships between the classes, and associated accessors. Further, the class diagram (3) encapsulates the class definitions necessary to create the class. For example, the class diagram in FIG. 1 contains a Purchase_Order class (2) with a PURCHASE_ORDER_ID attribute. The Purchase_Order class (2) is related to a LineItem class (4) with a one-to-many relationship. Further, the Purchase_Order class (2) contains an accessor, LineItems, for the relationship to the LineItem class (4). The LineItem class (4) contains an LINEITEM_ID attribute, a QUANTITY attribute, and a DISCOUNT attribute. Further, the LineItem class (4) contains an accessor, Product, for the relationship to the Product class (6), and an accessor, Purchase_Order, for the relationship to the Purchase_Order class (2). The LineItem class (4) is related to a Product class (6) with a one-to-one relationship. The Product class (6) contains a PRODUCT_ID attribute, a NAME attribute, and a PRICE attribute.

The class diagram (3), illustrated in FIG. 1, may be used to create numerous object graphs that conform to the class diagram. For example, FIG. 2 illustrates an exemplary object graph (8) that conforms to the class diagram (3 in FIG. 1). The object graph (8) contains a Purchase_Order_Object_1 (10) that contains a PURCHASE_ORDER_ID attribute. The Purchase_Order_Object_1 (10) is related to three LineItem objects 11, 12, and 13. As specified by the class diagram (3), each LineItem object (11, 12, and 13) contains a LINEITEM_ID attribute, a QUANTITY attribute and a DISCOUNT attribute. Each LineItem object (11, 12, and 13) is related to one Product object. For example, LineItem_Object_1 (13) is related to Product_Object_1 (14), LineItem_Object_2 (12) is related to Product_Object_2 (15), and LineItem_Object_3 (11) is related to Product_Object_2 (15). As specified by the class diagram (3), each Product object (14, 15) contains a PRODUCT_ID attribute, a NAME attribute, and a PRICE attribute. The Purchase_Order_Object_1 (10) may be called the root of the object graph (8) because the Purchase_Order_Object_1 (10) (explicitly or implicitly) references all objects in the object graph (8) and is the entry point into the object graph (8).

In the context of distributed applications, data are typically present as distributed objects, and the relationships between the objects are typically represented by object references. Each distributed object is associated with a datum that uniquely distinguishes this instance of data among all others in the distributed application. In many applications, the datum is a value within a distributed object, such as a "primary key," that defines the distributed objects identity. For example, in FIG. 2, the Purchase_Order_Object_1 (10) may be uniquely identified by the Purchase_Order_ID1.

In distributed applications, is it important that when a particular distributed object is used within a transaction (i.e., a discrete activity within a computer system; transactions are usually associated with database management, order entry, and other online systems), that the distributed object contains the most current/updated information.

One prior art solution to ensuring that the most current/updated information is present in the distributed object prior to initiating a transaction is Java™ Remote Method Invocation (RMI). RMI provides a means to transport the distributed object between two distributed processes (e.g., a client and a server), and create a new copy of the distributed object if an instance of the distributed object is currently present on the receiving process. The new copy of the distributed object has the same object identity as the instance of the distributed object currently present on the receiving process. The new copy of the distributed object is commonly referred to in the art as an "Alias." Additionally, in the event that a particular transaction requires an object graph (i.e., a number of related distributed objects), each object is requested individually. Further, if a requested distributed object is part of an object graph but is not the root distributed object, then the portion of an object graph required to reach the requested distributed object, starting at the root distributed object, is retrieved.

FIG. 3 illustrates a prior method for ensuring data coherency in a distributed system. Object Graph A (19) includes a root distributed object (16). The root distributed object (16) references two child distributed objects (18, 20). One child distributed object (20) additionally references two other child distributed objects (22, 24). Consider the case where an application on a separate process requires distributed objects 16 and 20. If RMI is used, then the following events occurs: (i) Response 1 instantiates a first alias root distributed object (16'); (ii) Response 2 instantiates a first alias child distributed object (18').

If a subsequent request requires child distributed objects (18), (20), and (22), the following events will occur: (i) Response 3 instantiates a second alias root distributed object (16") for distributed object 16; (ii) Response 4 instantiates a second alias child distributed object (18") for distributed object 18; (iii) Response 5 instantiates a first alias distributed object (20') for distributed object 20; and (iv) Response 6 instantiates a first alias distributed object (22') for distributed object 22.

The result of the two concurrent application requests is two object graphs (Object Graph B (21), Object Graph C (23)) located on the receiver. Further, there are multiple copies (i.e., aliases) of distributed objects having the same object identity, e.g., distributed object 18 has two aliases (18', 18") on the receiver. Thus, if two independent changes are made to each of the aliases (18', 18"), the update may be partial, or produce unexpected results.

For example, having two aliases of a same Employee distributed object in an application may lead to a case where the application modifies a "phone number" attribute of a first Employee alias distributed object. The application then stores the modifications made to the Employee alias distributed object to a database. The application subsequently modifies a "last name" attribute of the second Employee alias distributed object. The application then stores the modifications made to the second Employee alias distributed object to the database. As a result, the old "phone number" of the Employee is stored to a database.

SUMMARY OF INVENTION

In general, in one aspect, the invention relates to a method for merging a first object graph with a second object graph, comprising packaging the first object graph into an internal representation, wherein the internal representation includes an attribute value and an object identity for each of a plurality of objects in the first object graph, sending the internal representation to a receiver, traversing the internal representation by the receiver, updating an object instance in the second object graph with the attribute value from the internal representation, if the object identity corresponding to the object instance is found in an identity mapping table, creating and populating a new object instance with the attribute value from the internal representation, if the object identity corresponding to the new object instance is not found in the identity mapping table, and linking the new object instance to the second object graph.

In general, in one aspect, the invention relates to a system for merging a first object graph and a second object graph, comprising a server containing the first object graph, a client, operatively connected to the server, containing the second object, and an identity mapping table functionally interposed between the first object graph and the second object graph, wherein the identity mapping table comprises an object identity for each of a plurality of objects in the second object graph.

In general, in one aspect the invention relates to an apparatus for merging a first object graph with a second object graph, comprising means for packaging the first object graph into an internal representation, wherein the internal representation includes an attribute value and an object identity for each of a plurality of objects in the first object graph, means for sending the internal representation to a receiver, means for traversing the internal representation by the receiver, means for updating an object instance in the second object graph with the attribute value from the internal representation, if the object identity corresponding to the object instance is found in an identity mapping table, means for creating and populating a new object instance with the attribute value from the internal representation, if the object identity corresponding to the new object instance is not found in the identity mapping table, and means for linking the new object instance to the second object graph.

Other aspects and advantages of the invention will be apparent from the following description and the appended claims.

DETAILED DESCRIPTION

Figure 1:
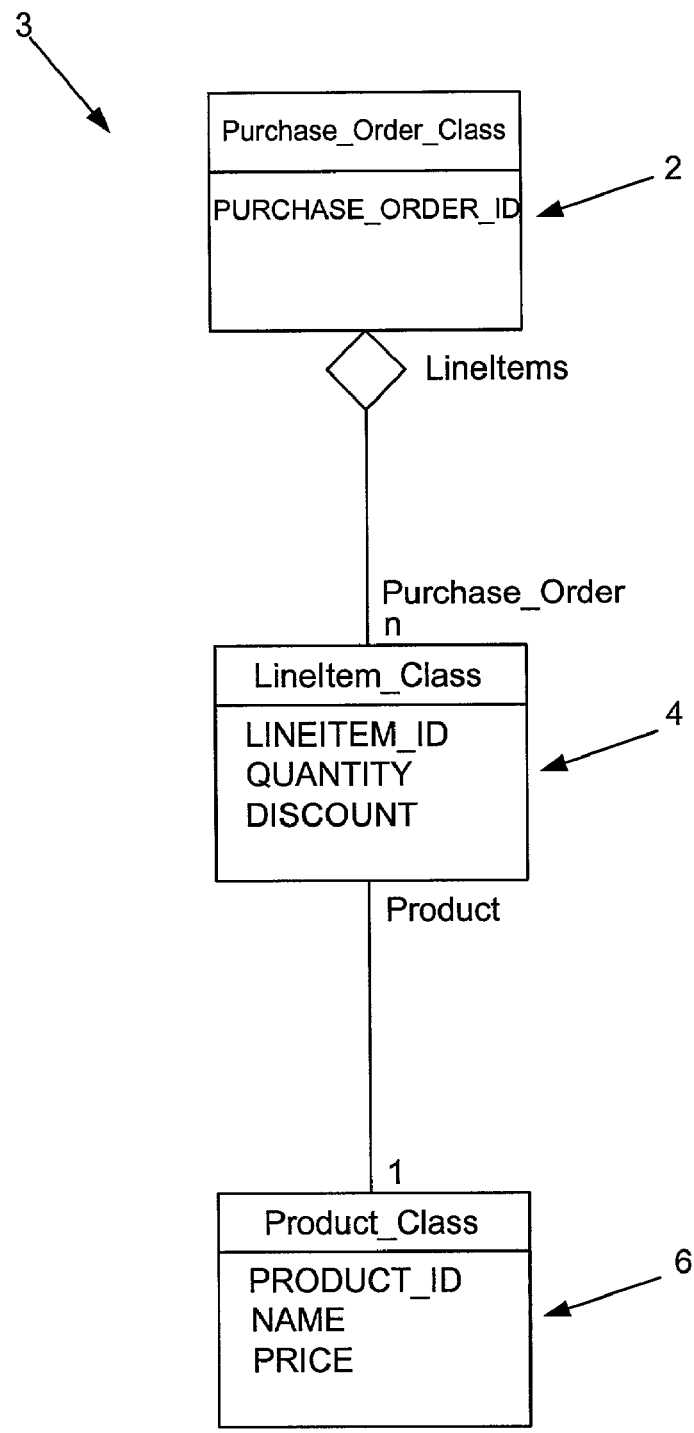
FIG. 1 illustrates a class diagram.
Figure 2:
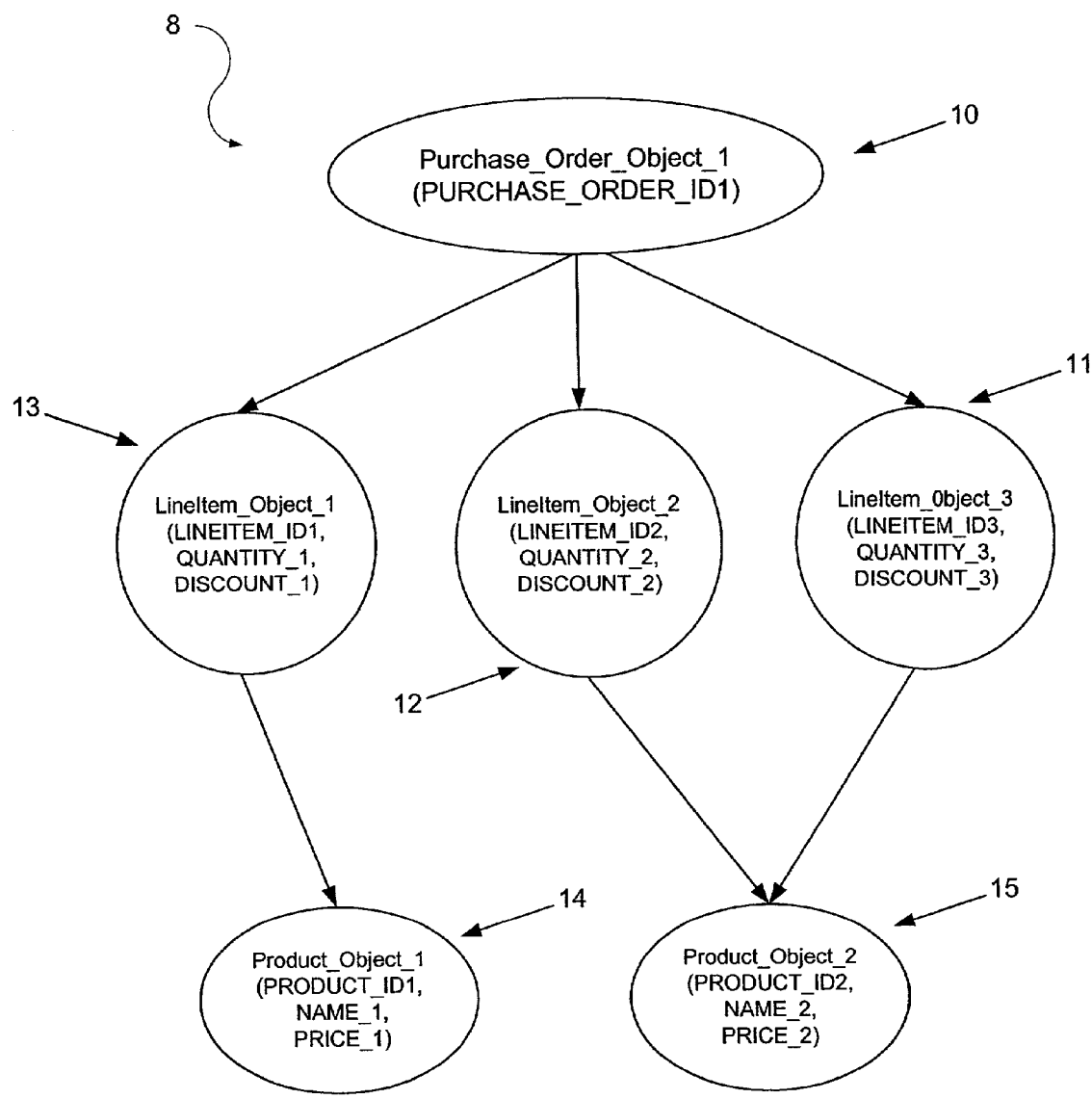
FIG. 2 illustrates an exemplary object graph created using the class diagram of FIG. 1.

Exemplary embodiments of the invention will be described with reference to the accompanying drawings. Like elements in the various figures are denoted by like reference numerals for consistency.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 4:
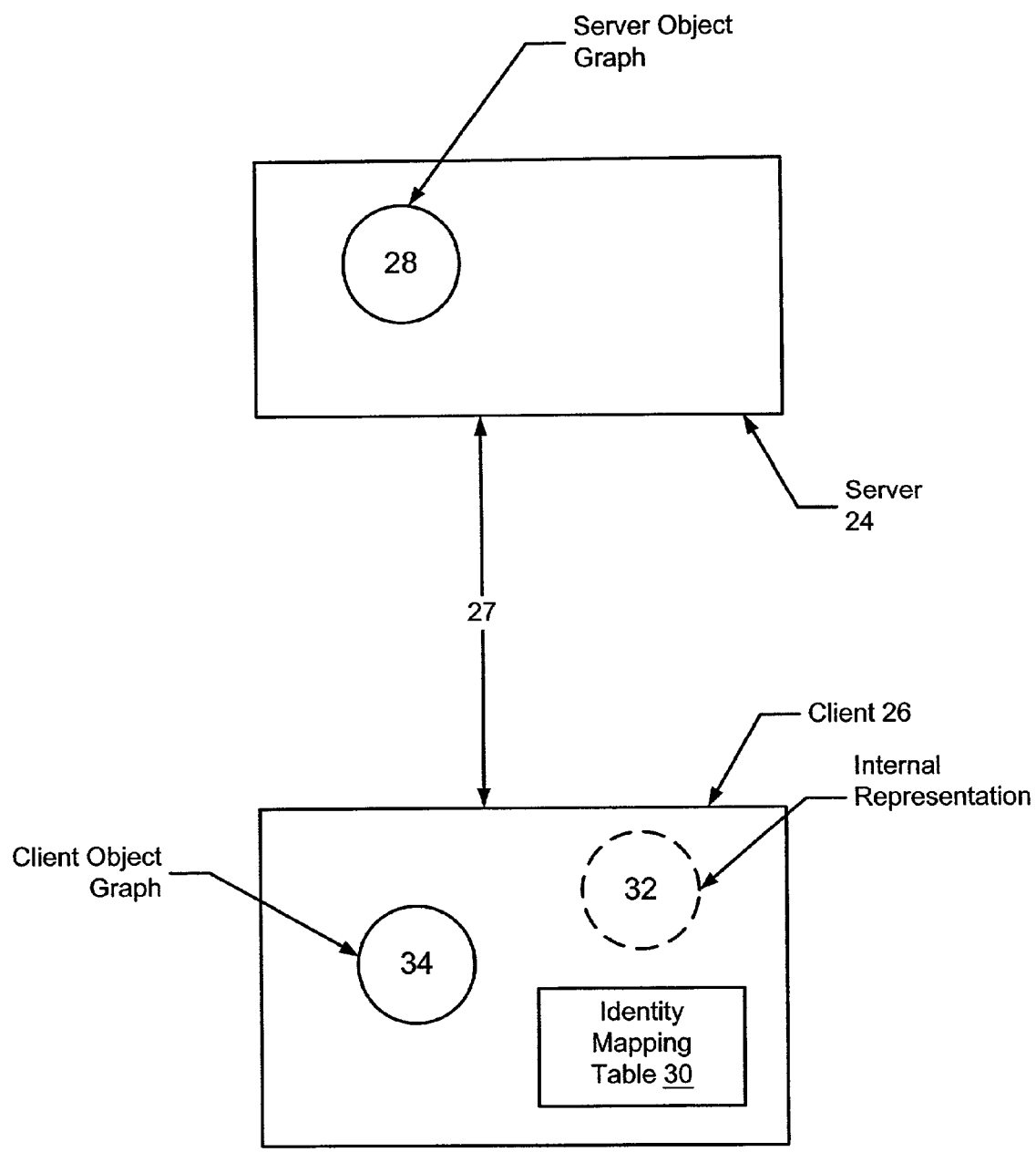
FIG. 4 illustrates a distributed system in accordance with one embodiment of the invention.

FIG. 4 illustrates a distributed system in accordance with one embodiment of the invention. The distributed system includes a server (24) and a client (26) connected via a network link (27). The server (24) contains a server object graph (28). Typically, a request for a distributed object or group of distributed objects (i.e., an object graph) is sent from a client application (not shown) to the server (24). The server (24) responds by retrieving the requested distributed object(s) from the server object graph (28) and packaging them into an internal representation (32).

In one embodiment of the invention, the internal representation (32) includes, for each distributed object, the object identity of the distributed object, references to other distributed objects if necessary, and attributes of the distributed object. In one or more embodiments of the invention, the distributed object may contain only the attributes that have been updated/modified since the last time the distributed object was requested.

The internal representation (32) is subsequently sent to the client (26), where it is interpreted by the Identity Mapping Table (IMT) (30). The IMT (30) includes a list of object identities corresponding to distributed objects currently located in a client object graph (34) located on the client (26). In one embodiment of the invention, the IMT (30) is implemented as a hash table. Further, in one embodiment of the invention, a checksum is associated with each object identity in the IMT (30). The checksum is used to determine if the data within a particular distributed object, residing on the server, has changed since the last time that particular distributed object was requested. Those skilled in the art will appreciate that another mechanism may be used to determine if the distributed object has been modified without detracting from the invention.

Figure 5:
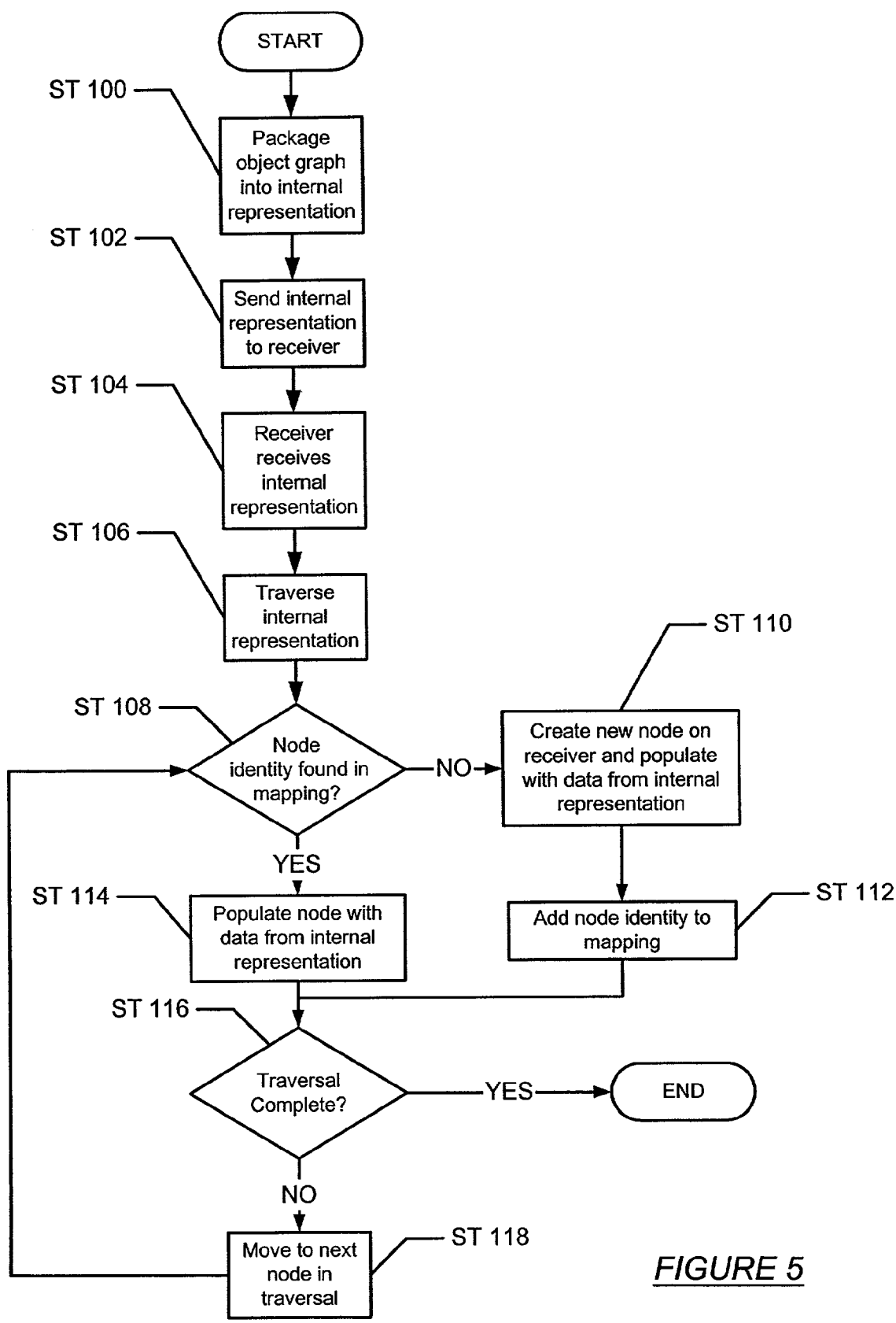
FIG. 5 illustrates a method for insuring data coherency in accordance with one embodiment of the system.

FIG. 5 illustrates a method for merging two object graphs in accordance with one embodiment of the invention. Once a request for an object graph or a portion of an object graph has been received, the object graph or portion thereof is retrieved and packaged into an internal representation (Step 100). The internal representation is sent to the receiver (Step 102). The receiver subsequently receives the internal representation (Step 104), and proceeds to traverse the internal representation (Step 106).

For each internal representation of a distributed object encountered, the receiver performs a lookup in the IMT to determine whether the particular distributed object is present (Step 108). If the particular distributed object is not present on the receiver (Step 108), then the receiver proceeds to instantiate the distributed object, using the internal representation (Step 110). The instantiation additionally includes linking the instantiated distributed object to the object graph present on the receiver. Once the distributed object has been instantiated, the corresponding object identity is added to the IMT (Step 112).

If the distributed object is present on the receiver (Step 108), then the receiver proceeds to update the data, if necessary, in the distributed object (Step 114). As mentioned above, this may be accomplished using a checksum. If the traversal is complete (Step 116), then the merge is complete. If the traversal is not complete, then the receiver proceeds to the next distributed object in the internal mapping (Step 118).

Figure 3:
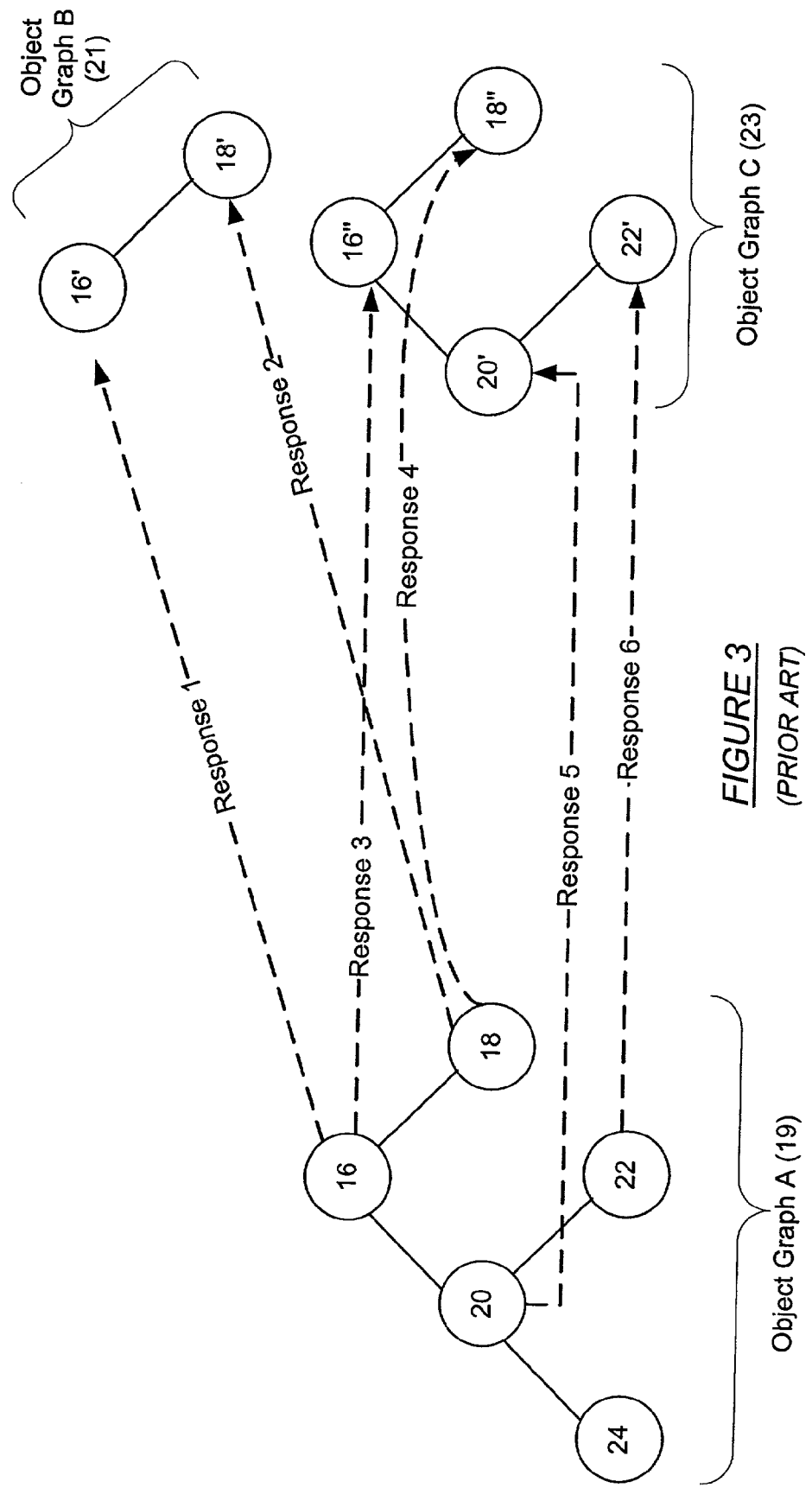
FIG. 3 illustrates a prior art method for ensuring data coherency in a distributed system.
Figure 6:
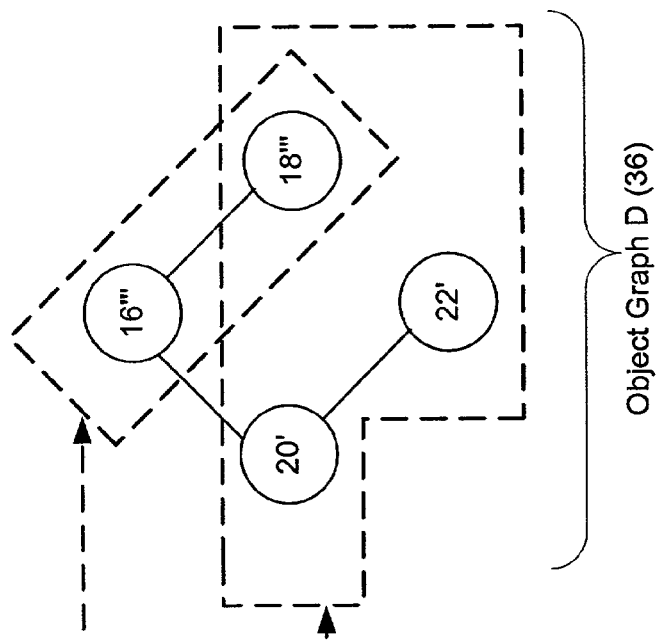
FIG. 6 illustrates a method for ensuring data coherency in accordance with one embodiment of the system.
Figure 6:
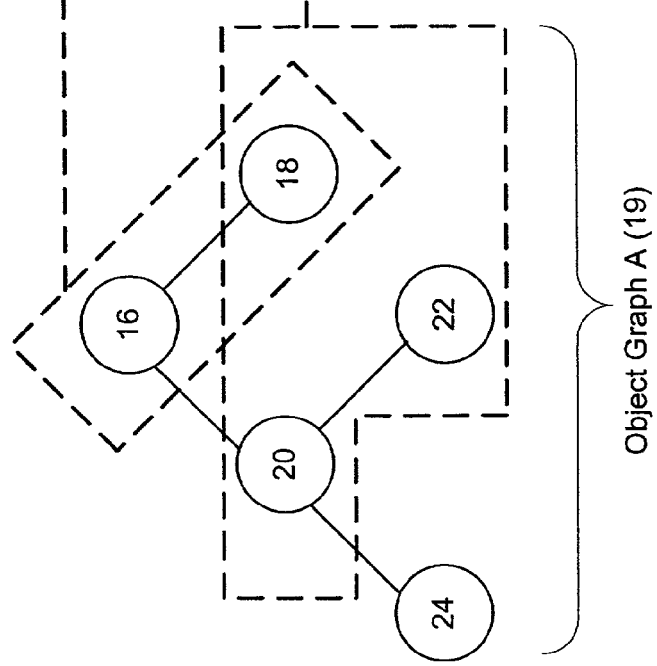

In the example illustrated in FIG. 3, two object graphs were created for two application requests. FIG. 6 illustrates a method for ensuring data coherency in accordance with one embodiment of the invention. In the case where an application on a separate process requires distributed objects 16 and 20. The following steps are performed: (i) Response 7 instantiates a copy of the root distributed object (16), and a copy of the child distributed object (20) on the receiver represented as (16''') and (20'''), respectively, and adds distributed object identities of distributed objects (16'''), and (20''') to the IMT (not shown). The one request, for distributed objects (16) and (20), requires only one response (i.e., Response 7) to instanitate both distributed objects on the receiver.

If the receiver subsequently requests distributed objects (18), (20), and (22), the following steps are performed: (i) Response 8 contains an internal representation of distributed objects (18), (20), and (22); (ii) the receiver uses the internal representation and the IMT to determine if each of the distributed objects is currently present on the receiver; (iii) in this case, distributed object (18) is already instantiated on the receiver as (18'''), thus (18''') is updated using the update mechanism described above; (iv) distributed object (20) is instantiated as (20'), linked to distributed object (18'''), and the object identity corresponding to distributed object 20' is added to the IMT; (v) distributed object (22) is instantiated as (22'), linked to distributed object (20'), and the object identity corresponding to distributed object (22') is added to the IMT.

The result of the two requests for distributed objects results in the instantiation of only one object graph ((Object Graph D (36) in FIG. 6). Additionally, only one response was required to handle each request. In one or more embodiments of the invention, the receiver contains an IMT for each transaction, allowing the distributed application to maintain transaction isolation.

The invention may include one or more of the following advantages. An efficient means to merge two object graphs in a distributed application is provided. Further, it is ensured that the most current data is available on a client without requiring the use of aliases. Further, the number of round trips that are necessary to retrieve a particular object graph is minimized, as an entire object graph may be retrieved in only one response from a sender.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for merging a first object graph and a second object graph, comprising:
   a server containing the first object graph;
   a client, operatively connected to the server, containing the second object; and
   an identity mapping table functionally interposed between the first object graph and the second object graph, wherein the identity mapping table comprises an object identity for each of a plurality of objects in the second object graph,
   wherein the client uses an object graph merging procedure and the identity mapping table to merge the first object graph and the second object graph, and
   wherein the object graph merging procedure comprises:
   packaging the first object graph into an internal representation, wherein the internal representation includes an attribute value and the object identity for each of a plurality of objects in the first object graph;
   sending the internal representation to a client;
   traversing the internal representation by the client;
   updating an object instance in the second object graph with the attribute value from the internal representation, if the object identity corresponding to the object instance is found in the identity mapping table;
   creating and populating a new object instance with the attribute value from the internal representation, if the object identity corresponding to the new object instance is not found in the identity mapping table; and
   linking the new object instance to the second object graph.

2. The method system of claim 1, the internal representation comprising an internal checksum for each of the plurality of objects in the first object graph.

3. The method system of claim 2, the identity mapping table comprising an instance checksum for each of a plurality of objects in the second object graph.

4. The method system of claim 3, wherein the object instance is updated if the internal checksum for the object instance is not equal to the instance checksum for the object instance.

5. The system of claim 1, wherein the identity mapping table is a hash table.

6. The method system of claim 1, wherein the object instance is updated only if the attribute value within the object has changed.

7. The method system of claim 1, further comprising a checksum to determine whether the attribute value within the object has changed.

* * * * *